(No Model.)

W. H. TOWNE.
DENTAL DISK HOLDER.

No. 506,350. Patented Oct. 10, 1893.

WITNESSES:      INVENTOR
Edw. F. Simpson, Jr.      William H. Towne,
Eli L. Starr      By atty J. S. Peyton

UNITED STATES PATENT OFFICE.

WILLIAM H. TOWNE, OF WORCESTER, MASSACHUSETTS, ASSIGNOR TO THE S. S. WHITE DENTAL MANUFACTURING COMPANY, OF PHILADELPHIA, PENNSYLVANIA.

DENTAL-DISK HOLDER.

SPECIFICATION forming part of Letters Patent No. 506,350, dated October 10, 1893.

Application filed June 26, 1893. Serial No. 478,857. (No model.)

*To all whom it may concern:*

Be it known that I, WILLIAM H. TOWNE, of Worcester, in the county of Worcester and State of Massachusetts, have invented certain new and useful Improvements in Carriers for Disks for Abrading, Polishing, &c., of which the following is a specification.

My invention relates to certain improvements, as hereinafter claimed, in that class of devices in which wheels or disks for grinding, cutting, polishing, &c., are detachably secured to shanks or mandrels adapted to be rotated.

Figure 1:
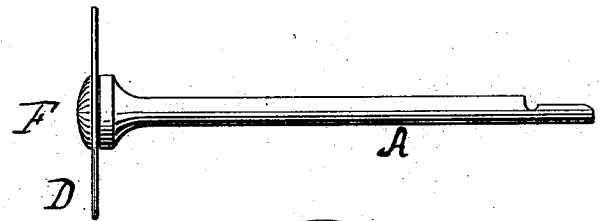
Figure 2:
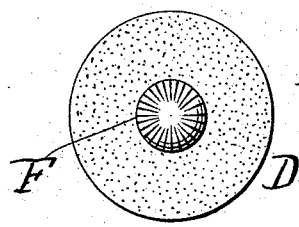
Figures 3, 4:
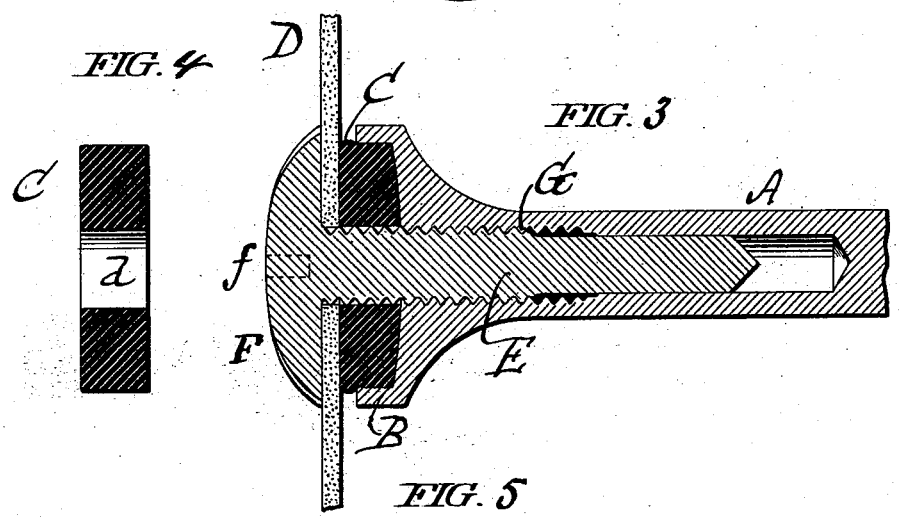
Figure 5:
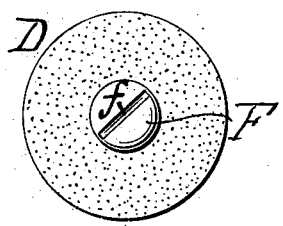

In the accompanying drawings which illustrate a suitable embodiment of my improvements, Figure 1 shows a carrier mandrel and applied disk suitable for dentists' use, and Fig. 2 an end elevation thereof. Fig. 3 is a central longitudinal section of the same on an enlarged scale. Fig. 4 shows in section, also on an enlarged scale, a cushion against which the disk is to be seated. Fig. 5 is a view similar to Fig. 2 showing a slight modification.

The carrier mandrel or shank A is shown as adapted to be actuated by a dental engine, by which it may be rapidly rotated in manner well understood. At its outer end or head the mandrel is adapted to have connected with it a yielding block or cushion against which to seat a suitable wheel or disk, the mandrel as preferably constructed being provided with the circular recess or socket B, into which is fitted the elastic block or cushion C of rubber having the central opening *d*.

In lieu of a cushion of rubber the cushion may be composed of any suitable equivalent for rubber, and the connection between the mandrel and cushion may be made in other ways than by means of the circular socket shown; as, for instance, by means of a cross slot or groove in the mandrel head to be engaged by a rib on the cushion; or by means of pins or studs on the mandrel head penetrating into the cushion or engaging holes or recesses provided therein; or the cushion might be provided with a flange around its edge, that is, made cup-shape, so as to embrace the mandrel head.

The disk D, suitable for abrading, polishing, &c., according to the work to be done, has a central opening to register with the opening of the cushion, and the shank E of a suitable clamp passes through the openings of the disk and cushion and engages by its screw thread with a screw G formed within the mandrel. The head F of the clamp may have the ordinary groove or nick *f* (Fig. 5 and dotted lines Fig. 3) to be engaged by a screw driver to tighten and loosen the clamp, but I prefer to roughen, rib or serrate the clamp head, for a purpose to be explained. A suitably roughened or serrated clamp head is shown by Figs. 1, 2 and 3. The head when thus constructed may also be nicked.

In operation, a disk having been placed in position, the shank of the clamp is inserted through the disk and cushion into the bore of the mandrel, and with the thumb and forefinger grasping the clamp head, or by way of pressure upon the clamp head by the ball of the thumb, provided a screw driver is not used, the clamp is screwed as tightly as needed to properly seat the disk against the compressible cushion. In tightening and loosening the clamp by hand, either the thumb or thumb and forefinger engaging the clamp head may be turned to turn the clamp, or the mandrel may be rotated (this is the preferable way) in the proper direction to connect or disconnect the parts without requiring the turning of the clamp by way of its head. With the clamp properly adjusted (see Fig. 3) the frictional contact between the disk and the compressed cushion against which it is seated is amply sufficient to make proper connection between the disk and carrier mandrel, by way of the cushion, so that the disk under usual working conditions will be forced to partake of the rotary motion of the mandrel.

In devices of the class to which my improvements belong, especially in some dental operations, it is requisite to provide for the frequent removal and replacement or change of disks, and it is highly desirable that this may be done with the least possible loss of time. It will be seen that by simple pressure of the ball of the thumb upon the serrated clamp head, and the rotation in the proper direction of the mandrel, disks may be secured and detached with great expedition. It will further be seen that the withdrawal of the clamp does not displace the cushion which is frictionally or adhesively held in the recess or socket of the mandrel head.

I claim as my invention—

1. The combination of the mandrel, an elastic cushion having connection with the mandrel head and serving as a disk seat, and a clamp by which to compress the cushion and hold the disk to its seat, substantially as set forth.

2. The combination of the mandrel provided with the threaded bore, the elastic cushion having connection with the mandrel head, and the clamp having the roughened or serrated head and provided with the threaded shank passing through the cushion and engaging the threaded bore of the mandrel, substantially as and for the purpose set forth.

In testimony whereof I have hereunto subscribed my name.

WILLIAM H. TOWNE.

Witnesses:
LARKIN L. DAVIS,
GEORGE M. CRANITCH.